United States Patent
Hreha et al.

(10) Patent No.: US 10,797,784 B2
(45) Date of Patent: Oct. 6, 2020

(54) SATELLITE WITH REGENERATIVE PROCESSOR

(71) Applicant: Space Systems/Loral, LLC, Palo Alto, CA (US)

(72) Inventors: William Hreha, San Jose, CA (US); Edmond Ahad, Montreal (CA); Guillaume Lamontagne, Saint-Eustache (CA)

(73) Assignee: Space Systems/Loral, LLC, Palo Alto, CA (US)

( * ) Notice: Subject to any disclaimer, the term of this patent is extended or adjusted under 35 U.S.C. 154(b) by 98 days.

(21) Appl. No.: 15/799,258

(22) Filed: Oct. 31, 2017

(65) Prior Publication Data
US 2019/0132044 A1    May 2, 2019

(51) Int. Cl.
| | |
|---|---|
| *H04B 7/185* | (2006.01) |
| *H04L 1/00* | (2006.01) |
| *H04B 17/309* | (2015.01) |
| *H04W 88/16* | (2009.01) |
| *H04W 84/06* | (2009.01) |

(52) U.S. Cl.
CPC ......... *H04B 7/185* (2013.01); *H04B 7/18515* (2013.01); *H04B 7/18543* (2013.01); *H04B 17/309* (2015.01); *H04L 1/0003* (2013.01); *H04L 1/0009* (2013.01); *H04L 1/0015* (2013.01); *H04B 7/18504* (2013.01); *H04L 2001/0097* (2013.01); *H04W 84/06* (2013.01); *H04W 88/16* (2013.01)

(58) Field of Classification Search
CPC .................................................. H04B 7/185
See application file for complete search history.

(56) References Cited

U.S. PATENT DOCUMENTS

| | | | |
|---|---|---|---|
| 2003/0033433 A1* | 2/2003 | Stroll | G06F 16/9574 709/246 |
| 2005/0039219 A1* | 2/2005 | Cooper | G10L 21/04 725/134 |
| 2010/0122143 A1* | 5/2010 | Lee | H03M 13/1117 714/752 |
| 2012/0051460 A1* | 3/2012 | Jeong | H03M 13/1165 375/298 |
| 2016/0204804 A1* | 7/2016 | Ikegaya | H03M 13/036 714/752 |
| 2017/0366372 A1* | 12/2017 | Arnaud | H04B 7/15 |
| 2018/0102949 A1* | 4/2018 | Smith | H04L 1/0017 |
| 2018/0191380 A1* | 7/2018 | Subramaniam | H03M 13/356 |

* cited by examiner

*Primary Examiner* — Samina F Choudhry
(74) *Attorney, Agent, or Firm* — Vierra Magen Marcus LLP (57) ABSTRACT

A satellite system that includes a gateway, a satellite, and a user terminal. The gateway determines a modulation scheme based on a function of uplink and downlink signal quality and a defined relationship between the downlink modulation to the uplink modulation. The satellite includes an input demodulator configured to apply an input modulation and coding (modcod) scheme; an output modulator configured to apply an output modcod scheme; and an output modcod scheme selector configured to select an output modcod scheme for the output modulator based on the input modcod scheme according a predetermined relationship between input modcod schemes and output modcod schemes. The user terminal providing the gateway a measure of downlink signal quality.

18 Claims, 9 Drawing Sheets

SATELLITE WITH REGENERATIVE PROCESSOR

BACKGROUND

Wireless communication systems may include a communication platform such as a dedicated terrestrial antenna, airborne platform, or communications spacecraft (e.g., a satellite). Such platforms typically operate within regulations that allocate at least one operating frequency bandwidth for a particular set of communications. Efficient use of such operating frequency bandwidth is a factor in operating a communication system. Adaptive Coding and Modulation (ACM) facilitates efficient use of bandwidth in various conditions that affect Signal to Noise Ratio (SNR).

In some systems, a satellite may relay data between one or more gateways and one or more subscriber terminals. Satellites in such a system may simply resend a received signal with some amplification and with some shift in frequency. Some satellites also provide some on-board processing of signals. An incoming signal may be demodulated and decoded so that digital content is obtained and may be directed to appropriate outputs. Outgoing signals are generated from the digital content (e.g. encoded and modulated) in what may be considered a regenerative arrangement. On-board processing generally comes with additional cost and complexity.

DETAILED DESCRIPTION

A satellite with on-board processing communicates using Adaptive Coding and Modulation (ACM) to adapt to changing conditions. Appropriate modulation and coding ("modcod") schemes may be selected for communication between the satellite and ground. A first modcod scheme may be used for communication between the gateway and the satellite, with a second modcod scheme used for communication between the satellite and a subscriber terminal. In general, signal-to-noise ratios (SNRs) are lower between a satellite and a subscriber terminal than between a gateway and the satellite so that different modcod schemes may be appropriate. The first modcod scheme for gateway-to-satellite communication may be selected by the gateway based on SNR feedback from the satellite and the subscriber terminal. The second modcod scheme for satellite-subscriber terminal communication may be determined according to the first modcod scheme. First and second modcod schemes may be linked in a lookup table (or in some other way) so that there is a predetermined correspondence between the first modcod scheme and the second modcod scheme so that in effect, both are selected together by the gateway. Thus, the satellite does not need to make a complex determination as to which modcod scheme to select based on satellite-subscriber terminal SNR but simply selects the satellite-subscriber terminal modcod scheme dictated by the gateway-satellite modcod scheme. Gateway-satellite modcod schemes may be linked to satellite-subscriber terminal modcod schemes according to their respective encoding rates to ensure outgoing data (e.g. going to subscriber terminal) can be encoded and sent faster than incoming data (e.g. from gateway) is received and decoded. Thus, buffering of data and hardware associated with buffering may be substantially reduced or eliminated. Neither does the satellite participate in resource allocation.

A switch in a satellite with on-board processing may direct communications traffic received by the satellite (e.g. from a gateway) to appropriate outputs, for example, to particular spot beams generated by the satellite, and in some cases where spot beams have multiple carriers, to particular carriers of a given spot beam. Assignment of incoming data (e.g. to spot beams and carriers) may use one or more lookup tables that indicate how to direct incoming data. For example, incoming data received from a gateway may be assigned to multiple output beams (e.g. spot beams) in a fan-out arrangement that is determined by a table. Output beams may include multiple carriers and assignment of incoming data to carriers of different output beams may be indicated by a lookup table. Data may be received in modcod blocks, where a modcod block is the unit of modulation and encoding of the modcod system (i.e. all data of a modcod block is subject to the same modcod scheme, with changes in modcod scheme occurring only between modcod blocks). Frames within a received modcod block may be distributed to carriers and output beams according to a table, or tables. For example, a table may indicate a pattern for distribution of frames of a modcod block to specific carriers of output beams. This provides a relatively uncomplicated way to control traffic in the satellite with little or no intervention from outside the satellite.

Figure 1:
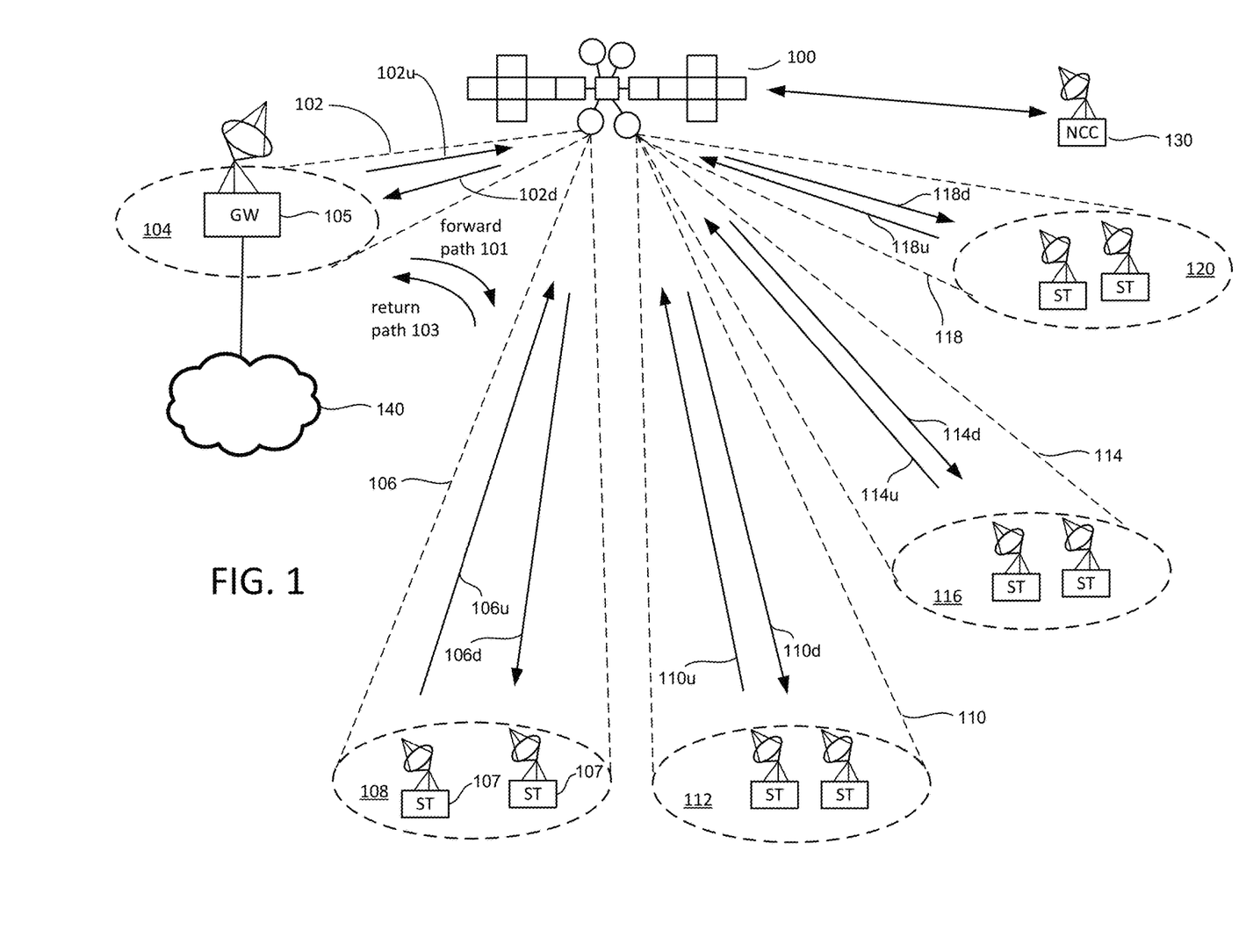
FIG. 1 is a block diagram describing a satellite communication system.

FIG. 1 depicts a block diagram of a wireless communications system that includes a communication platform 100, which may be a satellite located, for example, at a geostationary or non-geostationary orbital location. In other embodiments, other platforms may be used such as UAV or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway 105 and a plurality of subscriber terminals ST (including subscriber terminals 107). The term subscriber terminals may be used to refer to a single subscriber terminal or multiple subscriber terminals. A subscriber terminal is adapted for communication with the wireless communication platform including as satellite 100. Subscriber terminals may include fixed and mobile subscriber terminals including, but not limited to, a cellular telephone, wireless handset, a wireless modem, a data transceiver, a paging or position determination receiver, or mobile radio-telephone, or a headend of an isolated local network. A subscriber terminal may be hand-held, portable (including vehicle-mounted installations for cars, trucks, boats, trains, planes, etc.) or fixed as desired. A subscriber terminal may be referred to as a wireless communication device, a mobile station, a mobile wireless unit, a user, a user terminal, a subscriber, or a mobile.

In one embodiment, satellite 100 comprises a bus (i.e. spacecraft) and one or more payloads (i.e. the communication payload). The satellite may also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102u and a feeder downlink 102d. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. Note that the terms "feeder" beams and "service" beams are used for convenience. Both feeder beams and service beams are spot beams and the terms are not used in a manner to limit the function of any beam. In one embodiment, a gateway is located in the same spot beam as sub scriber terminals.

Subscriber terminals ST and satellite 100 communicate over service beams; for example, FIG. 1 shows service beams 106, 110, 114 and 118 for illuminating regions 108, 112, 116 and 120, respectively. In many embodiments, the communication system will include more than four service beams (e.g., 60, 100, etc.). Each of the service beams have an uplink (106u, 110u, 114u, 118u) and a downlink (106d, 110d, 114d, 118d) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102u of feeder beam 102, through a first signal path on satellite 100, and from satellite 100 to one or more subscriber terminals ST via downlink 106d of service beam 106. Although the above example mentions service beam 106, the example could have used other service beams.

Data can also be sent from the subscriber terminals ST over the return path 103 to gateway 105. In one example, communication over the return path comprises transmitting the data from a subscriber terminal (e.g., subscriber terminal 107 in service beam 106) to satellite 100 via uplink 106u of service beam 106, through a second signal path on satellite 100, and from satellite 100 to gateway 105 via downlink 102d of feeder beam 102. Although the above example uses service beam 106, the example could have used any service beam.

FIG. 1 also shows a Network Control Center 130, which includes an antenna and modem for communicating with satellite 100, as well as one or more processors and data storage units. Network Control Center 130 provides commands to control and operate satellite 100. Network Control Center 130 may also provide commands to any of the gateways and/or subscriber terminals.

In one embodiment, communication platform 100 implements the technology described above. In other embodiments, the technology described above is implemented on a different platform (or different type of satellite) in a different communication system.

The architecture of FIG. 1 is provided by way of example and not limitation. Embodiments of the disclosed technology may be practiced using numerous alternative implementations.

In one embodiment, a satellite includes an antenna system that provides a set of beams comprising a beam pattern used to receive wireless signals from ground stations and to send wireless signals to ground stations. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams (user beams) divide an overall service region into a number of cells. For example, U.S. Pat. No. 7,787,819 describes a pattern of 135 spot beams covering the continental United States (CONUS), Hawaii, Alaska, and Puerto Rico. It is noted that a service region may be defined in any manner to cover any desired geographic location. In one embodiment, the antenna system includes a phased array antenna, a direct radiating antenna, or a multi-feed fed reflector.

Dividing the overall service region into a plurality of smaller cells permits frequency reuse, thereby substantially increasing the bandwidth utilization efficiency. In some examples of frequency reuse, a total bandwidth allocated to the downlink is divided into separate non-overlapping blocks for the forward downlink 118 and the return downlink 115. Similarly, the total bandwidth allocated to the uplink is divided into separate non-overlapping blocks for the forward uplink 114 and the return uplink 119.

In other examples, some or all of the allocated bandwidth for user beams is reused by the gateway(s) 105, thereby providing for simultaneous operation of at least a portion of the feeder link and a portion of the user link at common frequencies. More specifically, forward uplink 102u and return uplink 118u may reuse the same frequency and forward downlink 118d and return downlink 102d may reuse the same frequency. Simultaneous operation of the feeder link 102 and the user link 118 at common frequencies means that the gateway(s) 105 may reuse any part of the total bandwidth allocated to the user beams. This may be accomplished in numerous ways known in the art, such as by using spatial isolation, time domain isolation, code isolation, etc.

Figure 2A:
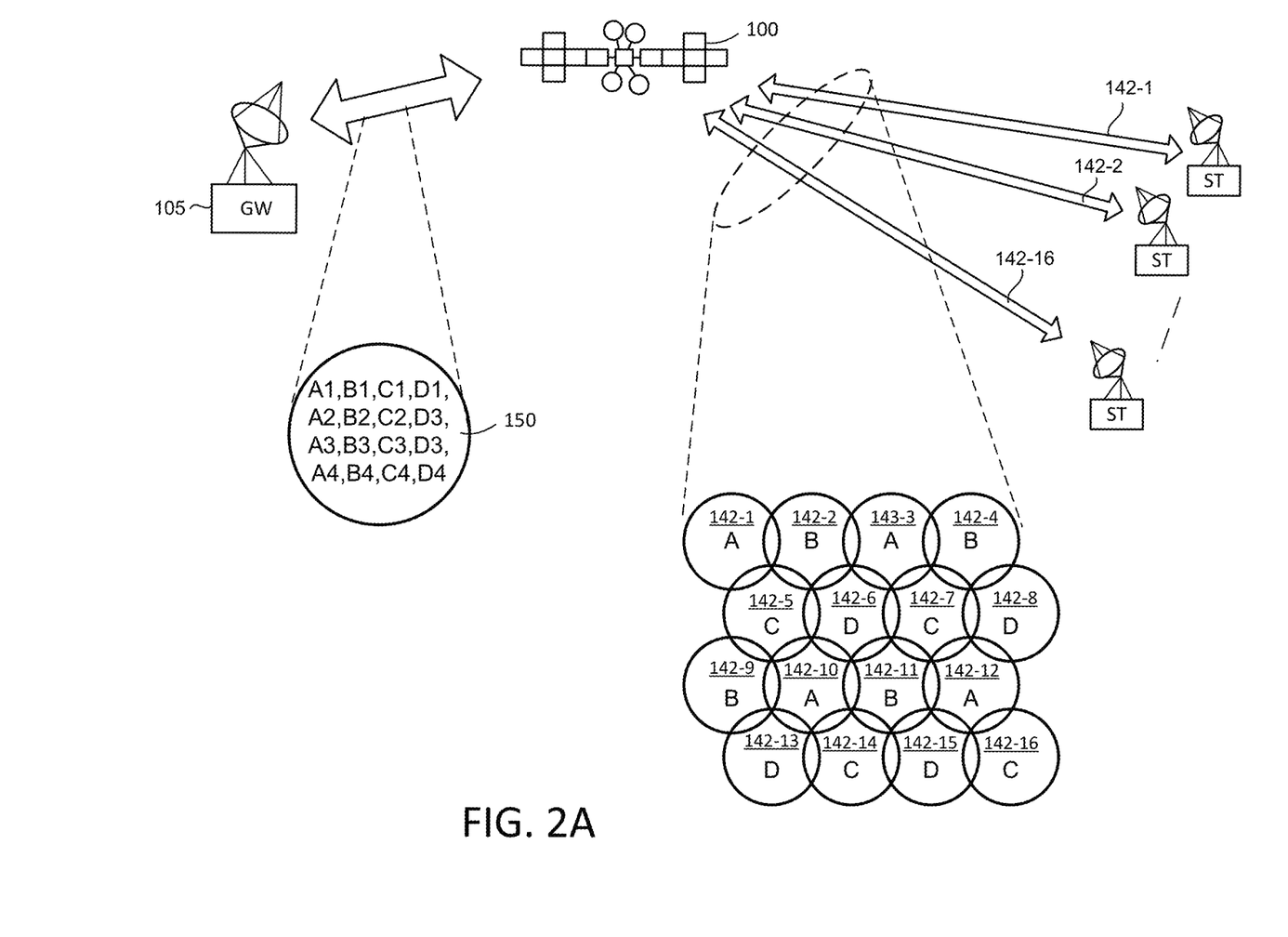
FIGS. 2A-C illustrate aspects of a satellite system.

FIG. 2A depicts a portion of a beam pattern. A cluster of spot beams, or user beams, is depicted that includes spot beams 142-1-142-16 that are adjacent and at least partially overlapping with at least one other spot beam in the cluster. The provided example shows a color re-use technique with four dedicated color assignments for user beams. The colors may correspond to unique combinations of frequency band and antenna polarization d. A small number of spot beams and corresponding coverage areas are shown by way of example, but it will be appreciated that the concepts may be extended to any number of spot beams or used with fewer spot beams. While an example is described with respect to forward downlink signals in user beams from a satellite to subscriber terminals, the concepts are equally applicable to return uplink signals as well.

The spot beams of FIG. 2A are roughly arranged into four rows. A first row includes spot beams 142-1, 142-2, 143-2 and 142-4; a second row includes spot beams 142-5, 142-6, 142-7 and 142-8; a third row includes spot beams 142-9, 142-10, 1432-11 and 142-12; and a fourth row includes spot beams 142-13, 142-14, 142-15 and 142-16. Each spot beam is assigned a dedicated color, where color is defined as a combination of frequency band and polarization. The spot beams in the first row alternate dedicated downlink color assignments 'A' and 'B,' beginning with an 'A' color assignment for spot beam 142-1 and ending with a 'B' color assignment for spot beam 142-4. The spot beams in the second row alternate dedicated color assignments 'C' and 'D,' beginning with a 'C' color assignment for spot beam 142-5 and ending with a 'D' color assignment for spot beam 142-8. The spot beams in the third row alternate dedicated color assignments 'A' and 'B,' beginning with an 'A' color assignment for spot beam 142-9 and ending with a 'B' color assignment for spot beam 142-12. The spot beams in the fourth row alternate dedicated color assignments 'C' and 'D,' beginning with a 'C' color assignment for spot beam 142-13 and ending with a 'D' color assignment for spot beam 142-16. The spot beans 142-1 through 142-16 are analogous to user/service links 117 of FIG. 1. A uniform pattern, as depicted in FIG. 2A is not required. Only three subscriber terminals, STs, are illustrated in FIG. 2A. It will be understood that each spot beam 142-1-142-16 may serve one or more subscriber terminals.

FIG. 2A also depicts a spot beam 150 for communicating with the gateway 105. Spot beam 150 is analogous to feeder link 102 of FIG. 1 and can be referred to as a feeder beam or gateway beam. FIG. 2A shows that satellite 100 communicates with gateway 105 in spot beam 150 (also known as feeder beam 150) using the following colors (frequency band+polarization): A1, B1, C1, D1, A2, B2, C2, D2, A3, B3, C3, D3, A4, B4, C4, and D4. In this embodiment, the feeder beam 150 uses sixteen colors while each user beam (142-1 to 142-16) uses one color. In one embodiment, each color of FIG. 2A includes 250 MHz of spectrum and feeder beam 150 is used to communicate with the subscriber terminals of user beams 142-1 to 142-16.

In order to operate a satellite communication system, or other wireless communication system (as the technology described herein is not limited to satellite communication systems), the operator (or other entity) typically must request permission from an appropriate governmental authority to utilize preselected frequency bands. For example, some satellites are provided with permission to operate in the Ka band, which includes uplink frequencies of 28.5-30.0 GHz and downlink frequencies of 18.7-20.2 GHz. Other frequency bands can also be used. Higher frequency bands have more capacity (bandwidth) to carry data. Therefore, it is desirable to operate at higher frequencies. For example, the V band can be used for uplinks at approximately 50 GHz and the Q band can be used for downlinks are approximately 37 GHz. A satellite communication system may be allocated up to approximately 5 GHz in each of the V and Q bands. Because the V and Q bands have higher capacity than the Ka band, the Ka band will be referred to as a low capacity frequency band and the Q/V bands will be referred to as high capacity frequency bands. Other low capacity frequency bands also exist (e.g., Ku band, LMDS band, NGSO band). Other high capacity frequency bands also exist (e.g., optical band, W band and M band). The technology described herein is not limited to any particular frequency band.

In one embodiment, in order to achieve enough capacity in the feeder links to have one gateway service subscriber terminals in sixteen (or more, or fewer) user beams, communication between the satellite will be in high capacity frequency bands such as Q/V bands, while communication between the satellite and the subscriber terminals will be in a low capacity frequency band such as Ka band.

Figure 2B:
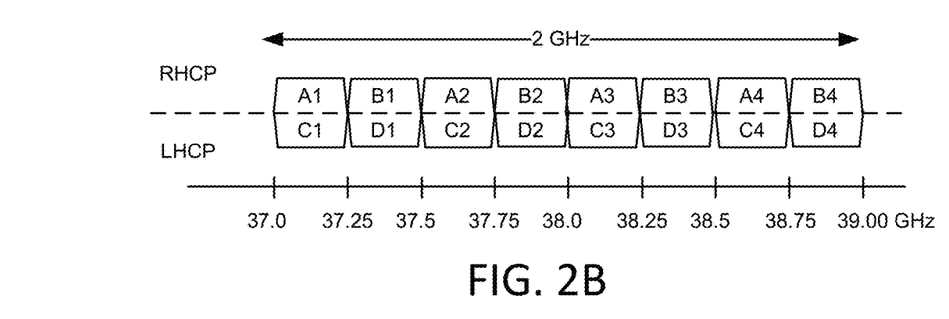

FIG. 2B shows an example frequency plan for the feeder beams (such as feeder beam 150) forward link for one embodiment where communication between the satellite and the gateway will be in high capacity frequency bands such as Q/V bands, while communication between the satellite and the subscriber terminals will be in a low capacity frequency band such as Ka band. FIG. 2B shows the colors A1, B1, C1, D1, A2, B2, C2, D2, A3, B3, C3, D3, A4, B4, C4, and D4 in the Q band for the feeder beam downlinks (return downlink). Right hand circular polarized (RHCP) colors and left hand circular polarized (LHCP) colors of the same frequency are separated by the dashed line in FIG. 2B. The frequency plan of FIG. 2B can be used for the beam pattern of FIG. 2A.

Figure 2C:
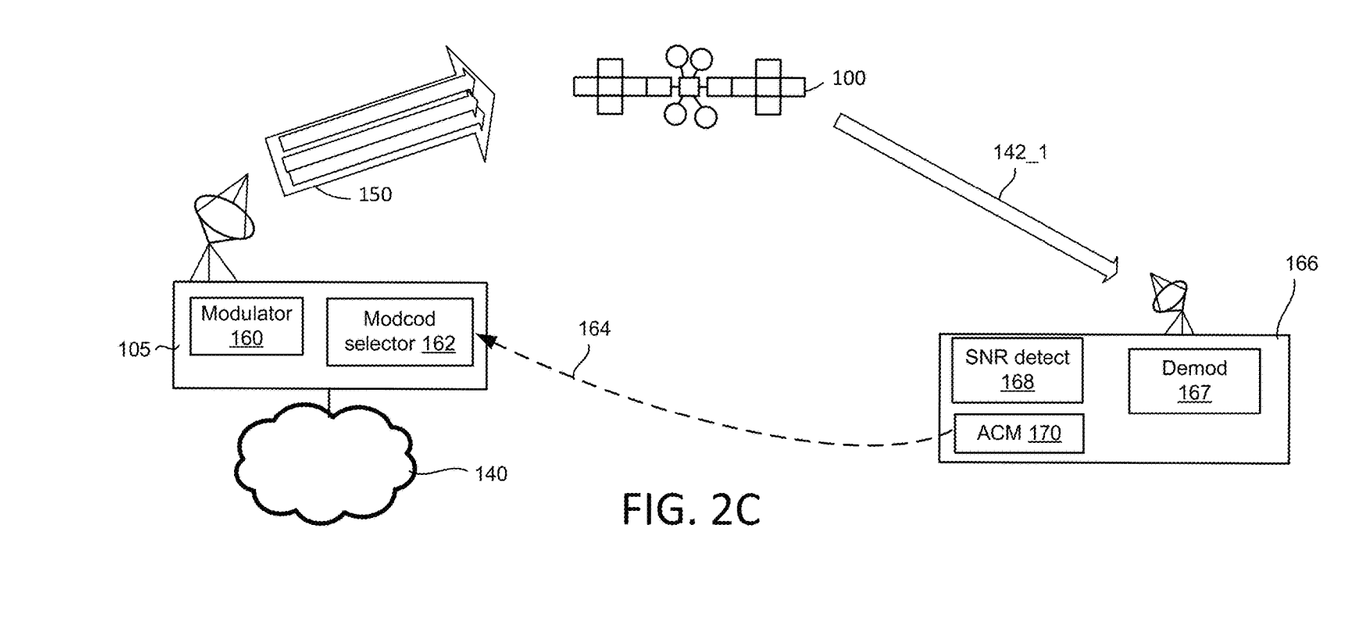

FIG. 2C illustrates an example of how ACM may be used in a satellite communications system. Gateway 105 receives data from a network 140. The received data is encoded and modulated by modulator 160 before being sent in feeder beam 150. For example, Forward Error Correction (FEC) encoding may be applied using one or more encoding schemes from a range of different options (e.g. Low-Density Parity Check (LDCP), turbo code, Bose-Chaudhuri-Hocquenghem (BCI-i) code, or other suitable FEC scheme). For any such scheme, a suitable encoding rate may be selected (i.e. a suitable amount of redundancy). Modulation may use a suitable scheme (e.g. QPSK, 8PSK, 16/32/64/128/256APAK), Modulation and encoding schemes (modcod schemes) for communication with satellites may conform to known standards. Examples include the Digital Video Broadcasting (DVB) standards for satellites (DVB-S), DVB-S second generation (DVB-S2), and DVB-S2 Extensions (DV13-S2X). In some examples, modcod schemes may be limited to a particular set of modcod schemes defined by such a standard, while in other examples, modcod schemes may not be limited to defined modcod schemes of any predetermined standard and may be customized for a satellite system.

A suitable modcod scheme may be selected by a modcod selector 162 and may be applied by modulator 160. Different modcod schemes may be used at different times depending on conditions (e.g. weather conditions, interference, noise, etc.). FIG. 2C shows an example in which a feedback signal 164 is sent from subscriber terminal 166 to modcod selector 162 of gateway 105. For example, subscriber terminal 166 may send feedback signal 164 via a return path using satellite 100, or in some other manner. Feedback signal 164 in this example includes an indication of signal quality for data received by subscriber terminal 166 from satellite 100. In one embodiment a modem 166 that demodulates and decodes incoming data from user beam 142_1 includes signal processing to measure SNR unit 168 that provides an indication of signal quality in this example.

SNR detection unit 168 may provide an SNR value, a channel-to-noise ratio (CNR), signal to interference ratio (SIR), carrier to interference ratio (CIR), carrier to noise plus interference ratio (CNIR), or other suitable indicator of signal quality. While the term "SNR detection unit" is used here, it will be understood that any suitable metric may be used to indicate the quality of a received signal. The SNR detection unit 168 provides signal quality data to ACM unit 170 which generates an indication of signal quality, feedback signal 164, which it sends to modcod selector 162. Modcod selector 162 selects a suitable modcod scheme according to feedback signal 164, based on the indication of signal quality obtained from SNR detection unit 168. For example, where SNR detection unit 168 shows that received data has low quality (e.g. low SNR) then modcod selector 162 may select a modcod scheme accordingly (e.g. high level of error protection and relatively low data rate). Modulator 160 then applies the selected modcod scheme to data sent to subscriber terminal 166, which in this case is sent via feeder beam 150, to satellite 100, and via spot beam 142_1 to subscriber terminal 166.

Figure 3:
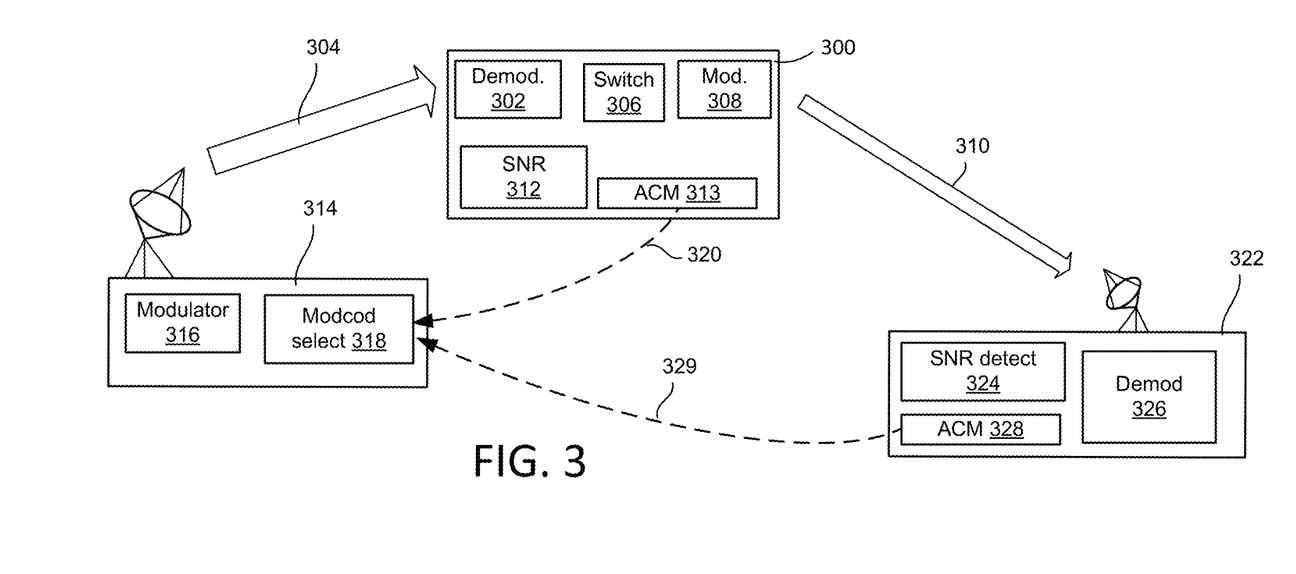
FIG. 3 illustrates aspects of a regenerative satellite system with different input and output modcod schemes.

FIG. 3 shows an alternative approach to using modcod schemes for satellite communication. Unlike the example of FIG. 2C, satellite 300 includes a demodulator 302 to demodulate incoming data (e.g. from a feeder beam 304), a switch 306 (which may also be referred to as a switching network, or router) to direct incoming data to an appropriate output, and a modulator 308 to modulate data received from switch 306 for sending (e.g. as a user link 310). Satellite 300 also includes a SNR detection unit 312 connected to demodulator 302. Demodulator 302 demodulates an incoming signal received via feeder beam 304 from gateway 314. This signal is modulated by modulator 316 in gateway 314 using a modcod scheme selected by modcod selector 318 (e.g. an appropriate modcod scheme defined by a standard such as DVB-S2X). Modcod selector 318 receives a feedback signal 320 from ACM unit 313 in satellite 300 (e.g. via a return path) that indicates signal quality of feeder beam 304 when it is demodulated by demodulator 302. For example, demodulator 302 may generate one or more indicators of signal quality when demodulating and decoding incoming data and SNR detection unit 312 may use signal processing or demodulating and decoding information to generate an indicator of signal quality, such as a bit error rate or an SNR value.

Switch 306 routes demodulated digital data to an appropriate destination in satellite 300 (described in more detail below). Prior to being sent from satellite 300 to subscriber terminal 322, digital data is encoded and modulated by modulator 308 (e.g. using a suitable modcod scheme according to a standard, such as DVB-S2X). A modcod scheme used by modulator 308 may be different from a modcod scheme used by modulator 316 and demodulator 302. Thus, a first modcod scheme may be used for feeder beam 304 (an input modcod scheme) while a second modcod scheme (an output modcod scheme) may be used for user link 310. A given portion of data that is sent from gateway 314 to subscriber unit 322 is modulated and demodulated twice in this arrangement, with different modulation schemes applied for the first (gateway-to-satellite) portion, and the second (satellite-to-subscriber terminal) portion.

Using different modcod schemes in this manner may provide several advantages including more efficient use of available bandwidth. For example, where a single modcod scheme is used between a gateway and a subscriber terminal as shown in FIG. 2C, the modcod scheme may depend on the weaker link between the satellite and subscriber terminal and this may leave unused capacity on the stronger link between the gateway and satellite (i.e. feeder beam could operate at higher data rate but encoding and modulation are limited by user link). Selection of different modcod schemes for different links may allow each modcod scheme to be optimized for conditions of the link for which it is selected.

FIG. 3 shows an SNR detection unit 324 coupled to demodulator 326 in subscriber unit 322. SNR detection unit 324 detects SNR or other measure of signal quality for user beam 310 at the location of 322 according to demodulation and decoding performed by decoder 326. ACM unit 328 then provides this signal quality information in feedback signal 329 to modcod selection unit 318 of gateway 314.

In some cases, a feedback signal may be provided from a subscriber terminal to a satellite so that the selection of a suitable output modcod scheme for a user beam may be directly made on the satellite, without any involvement by a gateway. However, this may require some additional hardware on a satellite. Furthermore, having completely independent selection of incoming and outgoing modcod schemes on a satellite may allow scenarios where incoming data arrives at a satellite faster than it can be sent because an incoming modcod scheme may have a high encoding rate and an outgoing modcod scheme, or schemes, may have low rates. Buffers may be required for such scenarios, which may add cost and complexity.

FIG. 3 shows both feedback signals 320 and 329 sent to modcod selection unit 318 of gateway 314. Thus, modcod selection unit 318 receives separate indicators of quality for feeder beam 304 and user beam 310. Accordingly, modcod selection unit 318 may coordinate selection of appropriate modcod schemes for both legs (i.e. an appropriate modcod scheme for first leg from gateway 314 to satellite 300 and an appropriate modcod scheme for second leg from satellite 300 to subscriber terminal 322).

According to an example, modcod schemes for both legs are selected in a coordinated manner that ensures that outgoing data can be sent from satellite 300 faster than it arrives, thereby obviating the need for large buffers or complex data management schemes. Incoming modcod schemes and outgoing modcod schemes are linked according to their encoding rates to ensure that data does not arrive at satellite 300 faster than it can be sent onwards to subscriber terminals. Incoming modcod schemes and outgoing modcod schemes may be linked in a predetermined arrangement. For example, a table known by the gateway modem select unit 318 and the satellite modulator 308 may tabulate relationships between incoming modcod schemes and outgoing modcod schemes. Modcod selection unit 318 may select a pair of modcod schemes (incoming modcod scheme and outgoing modcod scheme) from such a table. Modulator 316 then applies the input modcod scheme to data sent over feeder beam 304. For example, where feeder beam 304 is coupled to n output channels or carriers (which may go to n or fewer feeder beams), an outgoing modcod scheme or schemes may be chosen for n encoders that provide a collective encoding rate more than an encoding rate of an incoming modcod scheme. For example, individual outgoing encoding rate may be greater than 1/n times the input encoding rate.

A modcod scheme for user link 310 may be selected by satellite 100 in response to input from gateway 314 so that an input modcod scheme and an output modcod scheme are appropriately paired. According to an example, a satellite uses a lookup table to determine from the input modcod scheme which output modcod scheme to select as an output modcod scheme. The lookup table may be combined with other tables used by a switch to route data, and may contain entries similar to entries used by modcod selector 318 to select an input modcod scheme and an output modcod scheme in a coordinated manner.

Figure 4:
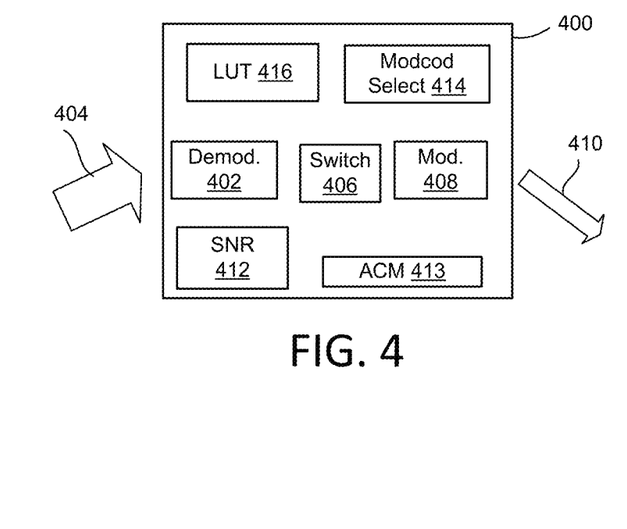
FIG. 4 illustrates a satellite with output modcod selection.

FIG. 4 shows an example of a satellite 400 that includes a demodulator 402 for demodulating and decoding a signal of feeder beam 404 according to an input modcod scheme, a switch 406 (which may also be referred to as a switching network, or router) to direct incoming data to an appropriate output, and a modulator 408 to modulate data received from switch 406 for sending (e.g. as a user link 410). Satellite 400 also includes an SNR detection unit 412 connected to demodulator 402 and an ACM unit 413. An output modcod scheme selector 414 is coupled to modulator 408 to select a modcod scheme to be used by modulator 408 to encode and modulate data sent over user link 410. Output modcod scheme selector 414 is also coupled to demodulator 402 to receive an indicator from demodulator 402 as to what input modcod scheme demodulator 402 is using (i.e. which modcod scheme is currently in use for data received over feeder beam 404). Output modcod scheme selector 414 is also coupled to a lookup table, LUT 416, which indicates a correspondence between input modcod schemes and output modcod schemes. Modcod selector 414 is configured to select an output modcod scheme for output modulator 408 based on the input modcod scheme according to the relationship between input modcod schemes and output modcod schemes listed in LUT 416 (i.e. finding the entry for the current input modcod scheme and reading the output modcod scheme for that entry). Thus, in this example, no separate command is provided from a gateway to indicate a modcod scheme to be used by modulator 408, the output modcod scheme is simply selected based on the input modcod scheme according to a lookup table. LUT 416 may be updated as needed from the ground and generally reflects input modcod schemes linked to output modcod schemes with encoding rates that ensure that data can be sent faster than it is received.

Figure 5:
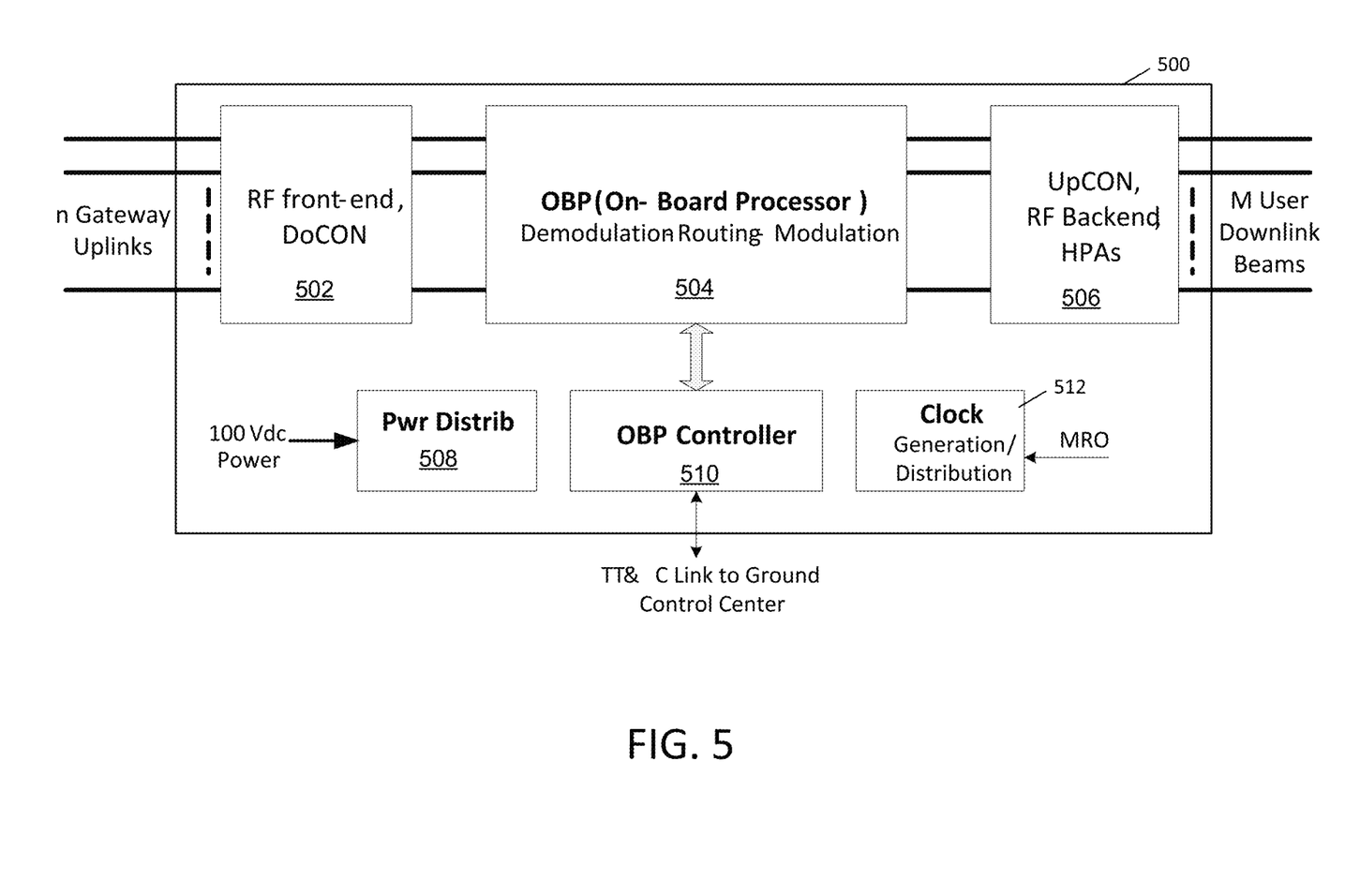
FIG. 5 illustrates a satellite with on-board processing.

FIG. 5 shows a simplified schematic of a regenerative payload on satellite 500 that includes on-board processing. Satellite 500's payload includes an RF front-end 502 "RF front-end, DoCON" that receives n Gateway uplinks and includes down-converters to convert frequencies of received RF signals. Outputs from RF front-end 502 are provided to OBP (On-Board Processor) 504, which performs demodulation, decoding, routing, encoding, and modulation. Thus, OBP 504 receives RF inputs and generates RF outputs, with intermediate steps that convert inputs to digital data and route the digital data in packets, to appropriate outputs. Outputs of OBP 504 are provided to RF back-end 506 "UpCON, RF back-end, HPAs" which includes up-converters to convert frequencies of RF signals from OBP 504 and High-Power Amplifiers (HPAs) to amplify RF signals for transmission. Outputs from RF back-end 506 are provided to M user downlink beams (e.g. spot beams). A power distribution unit 508 receives a 100 volt direct current power input and distributes electrical power to components including RF front-end 502, OBP 504, and RF back-end 506. An OBP controller 510 is coupled to OBP 504 and controls OBP 504 including routing of signals through OBP 504. For example, OBP controller may use one or more tables to manage routing of data and to manage modcod selection. OBP controller 510 is in communication with a ground control center through a telemetry, tracking, and command (TT&C) system, which may provide routing and other commands that are used by OBP controller 510 to operate OBP 504. A clock generation/distribution unit 512 receives an input from an MRO (Master Reference Oscillator) and distributes clock signals to components including RF front-end 502, OBP 504, and RF back-end 506. Use of an OBP to demodulate, route, and modulate signals provides a high degree of flexibility in how communications are handled and provides several benefits.

Figure 6:
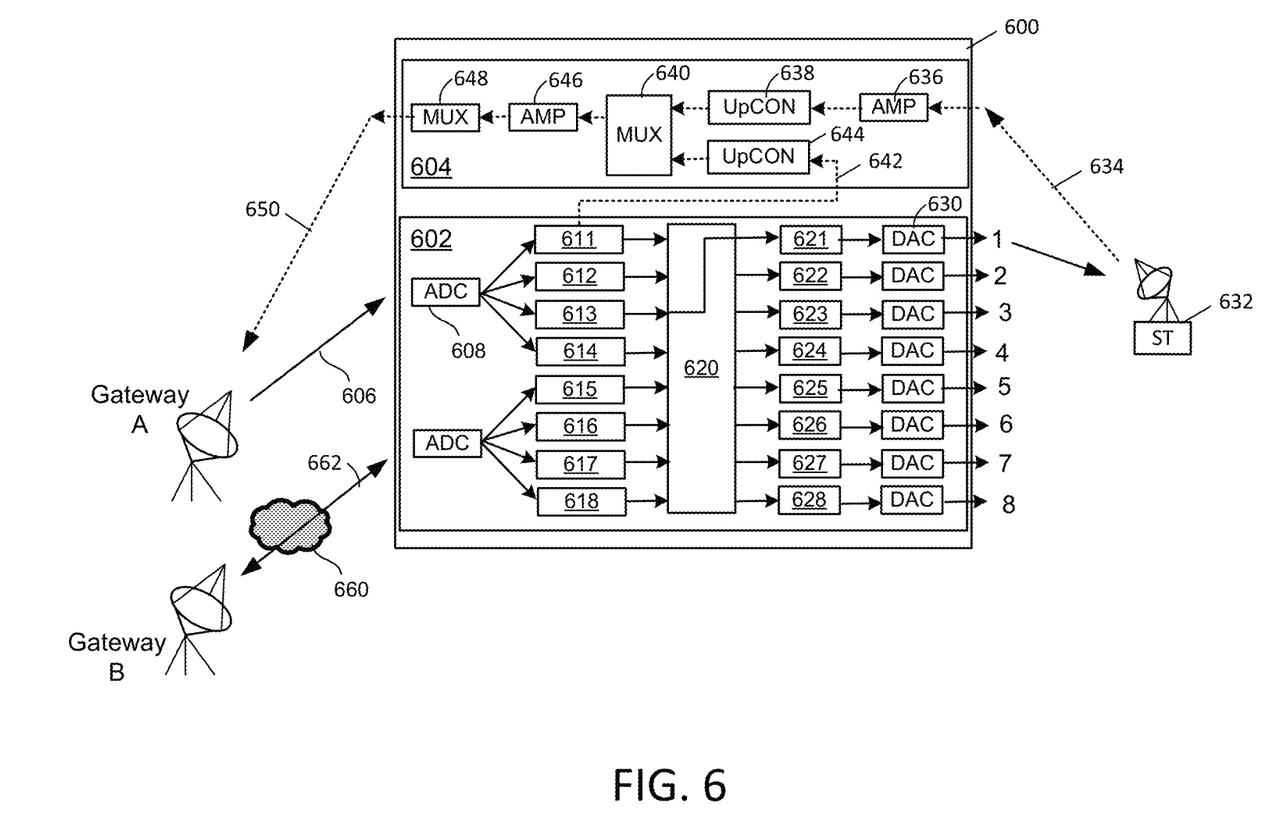
FIG. 6 illustrates a satellite with switching fabric connecting input ports and output ports.

FIG. 6 shows an example of a satellite 600 that includes an on-board processor OBP 602 and a return payload 604 (additional components such as upconverters, amplifiers, etc. are not shown for clarity). Return payload 604 includes hardware for providing return path data from subscriber terminals to gateways, where return path data includes data used for ACM purposes, for example, an indication of signal quality. Satellite 600 is shown in communication with two gateways, gateway A and gateway B. A feeder uplink 606 from Gateway A is provided to an analog-to-digital converter, ADC 608, in OBP 602. Digital output from ADC 608 includes data for transmission to multiple subscriber terminals via multiple output carriers, which may use multiple spot beams. In this example, digital output from ADC 608 corresponds to four output carriers or channels and the digital data is sent to four demodulators 611-614 accordingly (e.g. using one or more demultiplexers). Demodulators 611-614 each perform demodulation and decoding of data using an input modcod scheme (i.e. using the modcod scheme selected and used by gateway A). Demodulated output from demodulators 611-614 is provided to input ports of switch 620. Switch 620 then directs digital input from demodulators 611-614 to appropriate output ports. Digital data may be routed in any suitable manner between input ports and output ports of switch 620, e.g. using header information in packets, using time slot indicators, or otherwise. While FIG. 6 shows equal numbers of input ports and output ports, in other examples, these numbers may not be equal (e.g. there may be more output ports than input ports). Data is output via output ports to modulators 621-628, which perform encoding and modulation according to one or more output modcod schemes and then pass encoded modulated data to digital-to-analog converters (DACs) that provide RF outputs, which are sent to subscriber terminals. For example, data from ADC 608 that is provided to demodulator 613 is routed to modulator 621 which encodes and modulates the before providing it to DAC 630 to send as a user beam 1 to subscriber terminal 632. Outputs from other ports of switch 620 are sent to other modulators and DACs and are provided as user beams 2-8 as shown (e.g. via the same, or different spot beams, to additional subscriber terminals that are not shown in this illustration).

Feedback to gateway A for ACM is generated by both satellite 600 and subscriber terminal 632. ACM data is sent via return path 634 from subscriber terminal 632, e.g. subscriber terminal 632 sends an indicator of signal quality for user beam 1, such as an SNR value. Return path 634 is received by return payload 604 of satellite 600 where the return signal is amplified by amplifier 636 and its frequency is upconverted by upconverter 638 and provided to a multiplexer, MUX 640. Demodulator 611 also provides an indicator of signal quality for feeder uplink 606, which is provided to return payload 604 via pathway 642. Because data from feeder uplink 606 is provided to multiple demodulators, signal quality data can be provided by any of one of the modulators, or by multiple demodulators. For simplicity, and to save weight and power, a single demodulator (demodulator 611) receiving data from feeder uplink 606 is used to provide signal quality data (e.g. SNR) in this example. In other examples, a different demodulator, or demodulators may be used to provide signal quality data. A signal from pathway 642 is upconverted by upconverter 644 and is provided to MUX 640. MUX 640 combines the signals representing signal quality of feeder uplink 606 and signal quality of user beam 1 to provide an output that is amplified by amplifier 646, combined with other return pathway data by MUX 648 and sent to gateway A via return downlink 650. Thus, gateway A receives separate feedback for each leg of data transmission between gateway A and subscriber terminal (feeder uplink 606 to satellite 600 and user beam 1 from satellite 600).

FIG. 6 shows a cloud 660 along the pathway of feeder beam 662 between gateway B and satellite 600. Cloud cover or other factors may cause one or more feeder beams to be degraded. Redundancy may be provided to reduce the risk of a gateway being unusable (e.g. redundant gateways may be provided). However, redundancy may be costly. Using switch 620, ensures that data may be provided to all user beams even when a gateway becomes unusable. For example, if gateway B is unusable, then demodulators 615-618 do not receive data and thus, switch 620 has no input on four of eight input ports. However, data that would have been sent via gateway B may be directed to gateway A (e.g. via ground network such as a fiber optic network) and may be combined with other data and sent to satellite 600 where switch 620 routes data appropriately to maintain service. For example, where feeder beam 662 was coupled to user beams 1-8 and then stopped functioning, this data may be routed through gateway A (which was idle) to satellite 600 and may be routed by switch 620 to modulators 625-628, through DACs to user beams 1-8. Thus, inputs and outputs of switch 620 are not necessarily linked in a one-to-one relationship. Multiple data channels are combined in feeder beams and may be demultiplexed (e.g. using time division demultiplexing, frequency division demultiplexing, or otherwise) into individual channels in a flexible manner that allows the number of channels serviced by a given feeder beam to increase to compensate for degradation or loss of another gateway.

Figure 7:
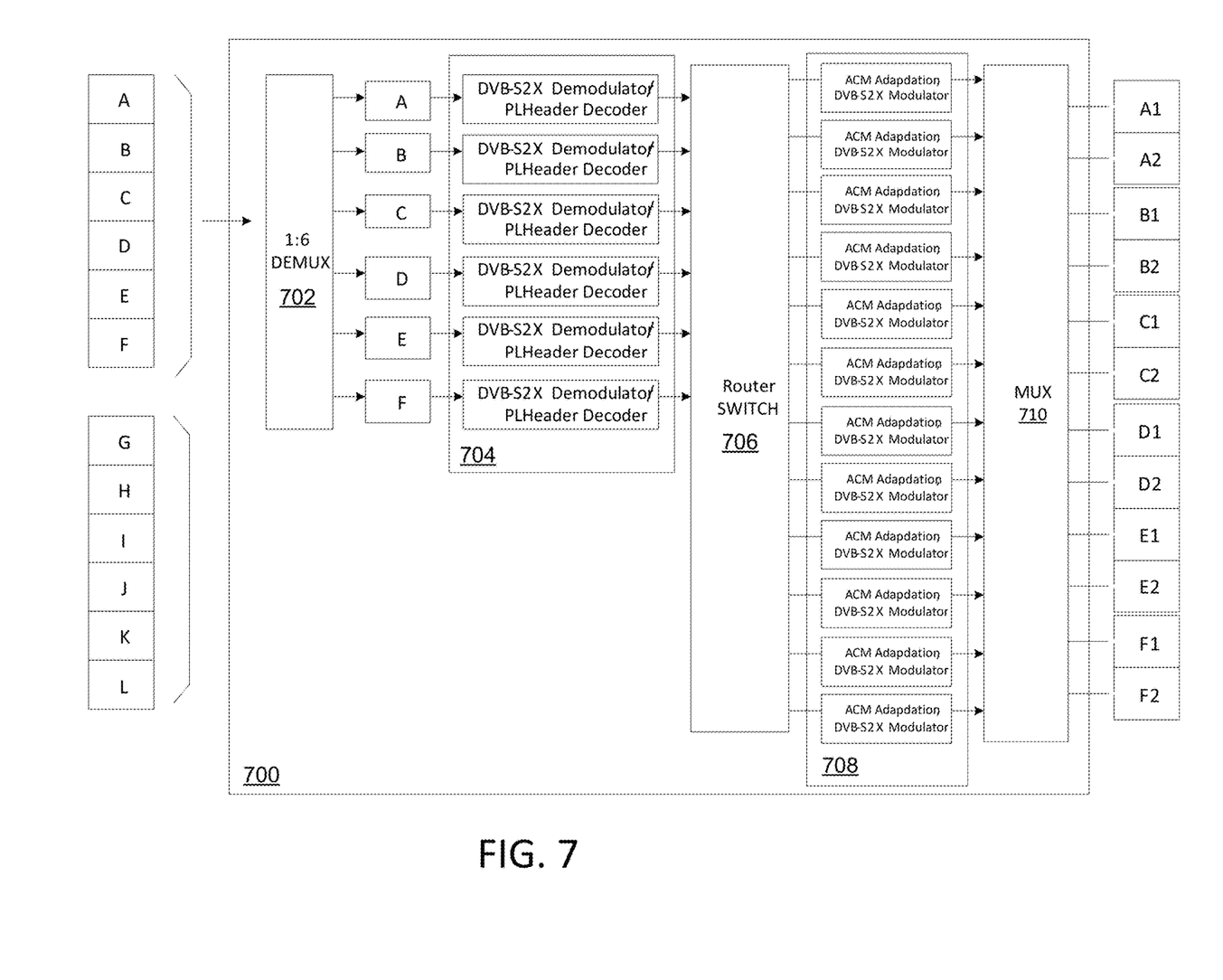
FIG. 7 illustrates an example of routing of input channels to output channels.

FIG. 7 shows an example of how a processor 700 may route input channels to output channels (output carriers). Input channels A-F are received on a feeder uplink as six channels of 500 MHz within a 3 GHz band (V-band). Input channels A-F are digital input channels in this example (an analog-to-digital converter, not shown in FIG. 7, may convert analog input from an antenna to digital output). These channels are demultiplexed by 1:6 demultiplexer 702 (e.g. frequency division demultiplexing), which provides channels A-F separately to demodulators 704 ("DVB-S2X Demodulator/PLHeader Decoder"), which demodulate and decode data according to modcod schemes of the DVB-S2X standard. Each channel, A-F is demodulated and decoded by a corresponding demodulator and different modcod schemes may be used for different channels. Outputs from demodulators 704 are provided as inputs to input ports of switch 706 which then routes demodulated and decoded data from input ports to output ports. One input port may provide data that is distributed to one or more output ports. In the example of FIG. 7, input data from six input ports is distributed to twelve output ports, with data from an individual input port distributed to two output ports. In other examples, data from an input port may fan out to more than two output ports (e.g. twelve output ports). Digital data from output ports of switch 706 is provided to corresponding modulators 708, which apply DVB-S2X modulation to provide ACM ("ACM adaptation DVB-S2X Modulator") on each output channel. Output channels are then provided to multiplexer 710 allowing multiple modulated carriers to be routed to one user beam which provides the twelve output channels A1-F2 for sending in spot beams. Output channels are numbered according to their corresponding input channels. Thus, output channels A1 and A2 correspond to input channel A, output channels B1 and B2 correspond to input channel B, and so on. While processor 700 manages six input channels A-F in this example, additional input channels G-L (e.g. from another feeder beam) may be similarly managed by another processor to provide another twelve output channels. Additional input channels may be similarly handled by additional processors. Such processors may be interconnected to allow routing of data between processors. Switches of individual processors (such as switch 706 of processor 700) may be linked together to form a switching fabric that may allow data from an input port of any linked switch to be sent to an output port of any linked switch. For example, input channel G may be demodulated and decoded (not shown in FIG. 7) and provided to an input port of a switch that is linked to switch 706. Corresponding outputs (e.g. G1 and G2) may be routed to switch 706 and to modulators 780 and provided as outputs of processor 700.

Figure 8:
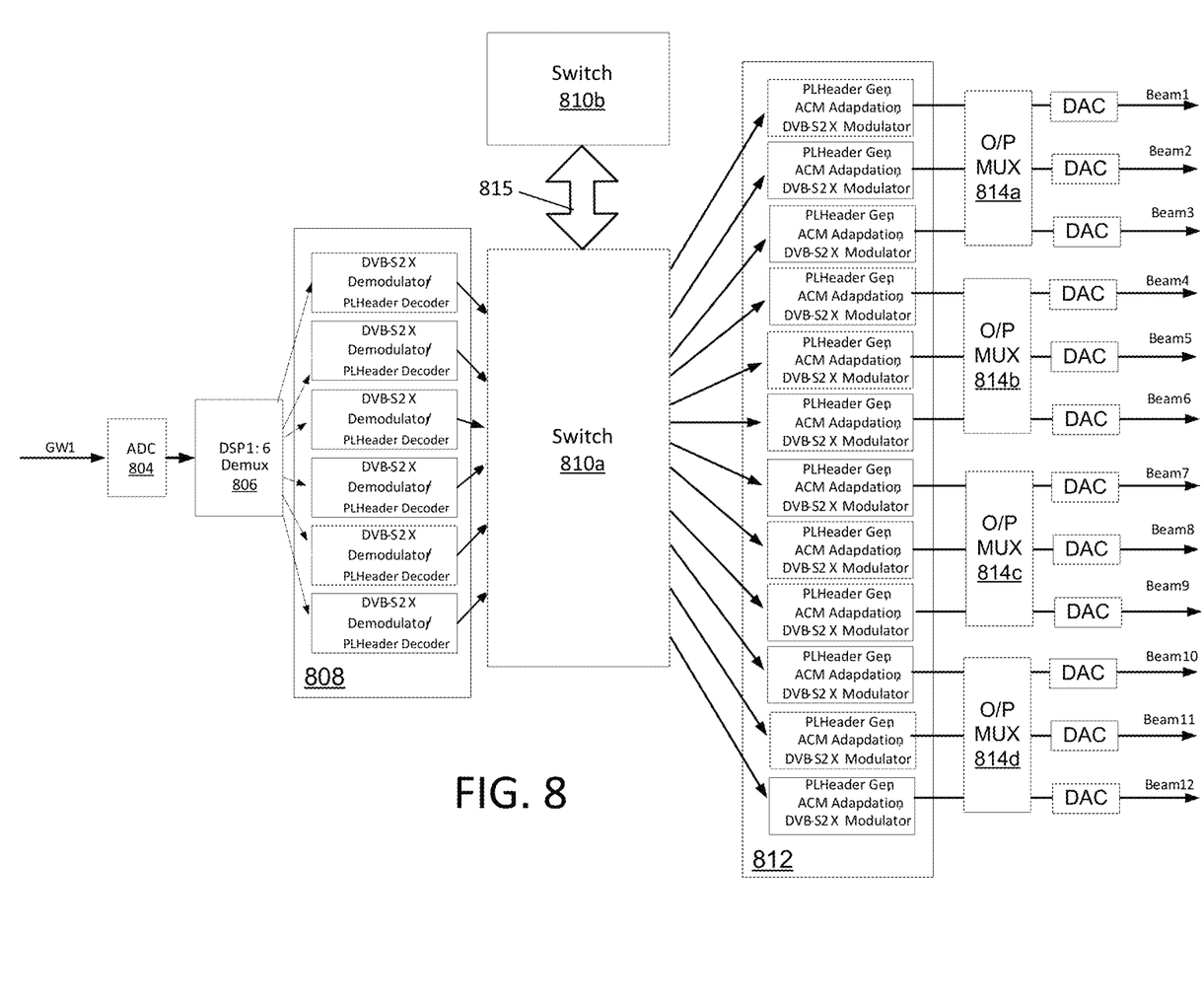
FIG. 8 illustrates a switch connected to other switches through a high-speed serial link.

FIG. 8 shows an example of how input from a gateway (GW1) may be handled using on-board processing. An analog-to-digital converter, ADC 804, receives input from GW1 as a 3000 MHz RF input, consisting of 6 carriers of 500 MHz, which is demultiplexed by 1:6 demultiplexer 806 into six separate carriers that are separately demodulated and decoded by demodulators 808 ("DVB-S2X demodulator/PLHeader Decoder") according to a modcod scheme or schemes used to encode and modulate data at GW1. For example, a spectrum efficiency of about 4.5 bits/Hz may provide a data rate of about 2 Gbps, modulated at 476 MSymb/s. Outputs of demodulators 808 are provided to input ports of switch 810a, which directs input data to twelve output ports as before (one-to-two fan out). Routing may be performed according to one or more tables, which may also be used for modcod selection. Outputs are encoded by encoders 812, which may generate new physical layer ("PL") headers and modulate according to modcod schemes defined by DVB-S2X standard based on modulation correlation tables. For example, a data rate of about 2.3 bits/Hz may provide a data rate of about 1 Gbps, or about half of the data rate of demodulators 808. Outputs of encoders 812 are provided to output multiplexers 814a-d which allow multiple carriers to be routed to a single beam and then converted by digital-to-analog converters ("DAC") into analog outputs, beams 1-12, which may be spot beams from a satellite.

Switch 810a is connected to a High Speed Serial Link (HSSL) 815 which connects switch 810a and switch 810b, and may connect one or more other switches (not shown). A bidirectional serializer/deserializer (SerDes) link on a HSSL may provide a data speed of about 12.5 Gbps. Thus, data from an input port of one switch such as switch 810a may be routed to an output port of another switch such as switch 810b. Where a particular switch is generally associated with a particular gateway and that gateway is not in operation (e.g. because of weather, did not get funding, or other condition) then data may be rerouted through other gateways to inputs of other switches and then, through a HSSL, to outputs of the particular switch and on to beams associated with the particular switch in what may be considered "diversity switching" and may also provide gateway roll out flexibility. In this way, spot beams may be maintained after the gateway normally associated with those spot beams fails (though this may be at a lower data rate). Switches combined in this manner form a switching fabric that may operate as a single switch so that data from any input port can be routed to any output port.

Figure 9A:
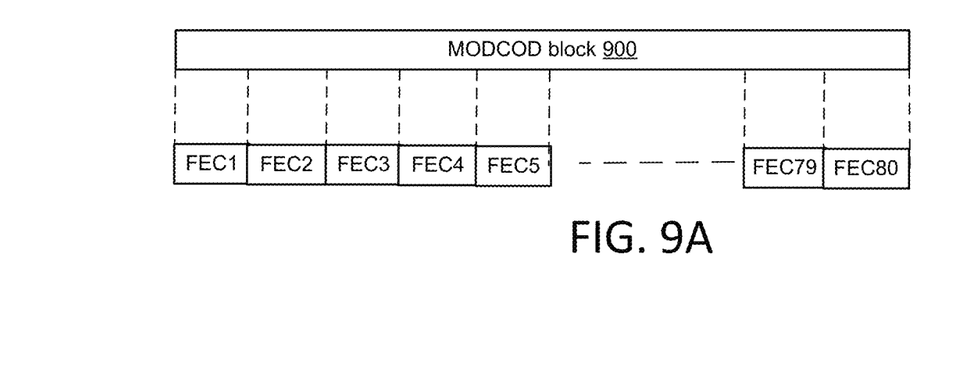
FIGS. 9A-C illustrate tables used by an on-board processor.

One or more tables may be used to manage operation of OBPs in a simple low-cost manner. For example, where an input channel fans out to provide multiple output channels, the relationships between inputs and outputs may be established by one or more tables. In one embodiment, FEC frames within a modcod block that is received at an input port of an OBP may be routed to output ports according to a table. FIG. 9A shows an example of how a modcod block 900 is made up of multiple Forward Error Correction (FEC) frames (FEC1-FEC80). For example, a modcod block may consist of 80 FEC frames as shown. A modcod block is a minimum unit of a modcod system so that all data of a modcod block is subject to the same modcod scheme. Different modcod blocks may be subject to different modcod schemes (i.e. modcod scheme may change from modcod block to modcod block). Modcod block 900 may be a portion of data that is received on a given input port and is demodulated and decoded according to a modcod scheme. FEC decoding may be performed on a frame-by-frame basis with each FEC frame including user data and FEC data.

Figure 9B:
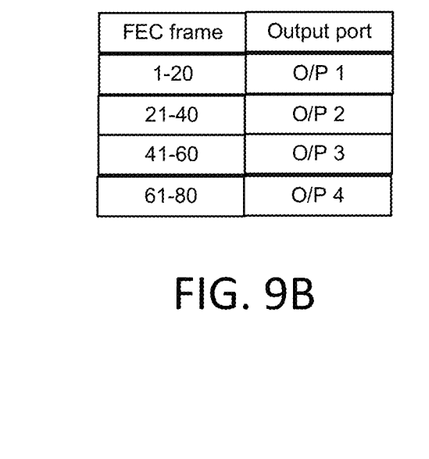

FIG. 9B shows an example of a table that indicates how FEC frames of modcod block may be routed to output ports. In this example, data of a modcod block that is received on a given input port (e.g. input port 1) is distributed to four output ports (O/P 1-O/P 4) as shown. This may be considered as a form of time division demultiplexing. While data is distributed evenly in this example, with each output port receiving 20 FEC frames of an 80 frame modcod block, in other examples, data may be unevenly distributed with some output ports getting more data than others. The distribution of frames to output ports may continue over many modcod blocks, for example, until the table is updated for some reason. The table may be updated by a network control center as subscriber needs change.

In some cases, two or more carriers are configured per output port. A table may be used to indicate which data is provided to carriers of an output port. This table may be separate from a table assigning data to output ports (e.g. as shown in FIG. 9B) or may be combined as a table that shows both the output ports and the carriers.

Figure 9C:
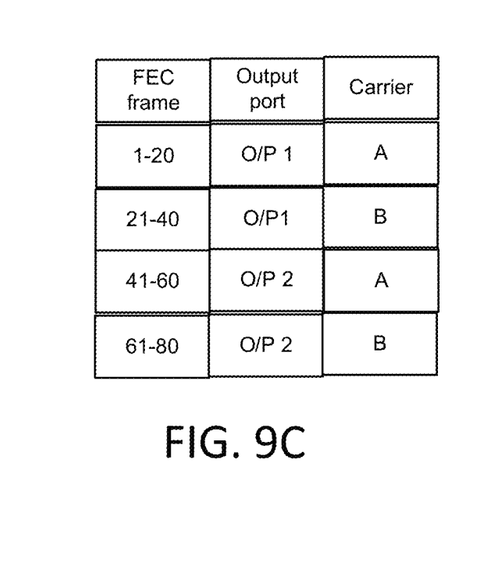

FIG. 9C shows an example of a table that shows both assignment of FEC frames to output ports and FEC frames to carriers of each port. In this example, a modcod block of 80 FEC frames is distributed to two output ports, O/P 1 and O/P 2, each having two carriers, A and B. FEC frames are distributed evenly between these four carriers in this example. In other examples, FEC frames may be unevenly distributed between output ports and/or between carriers.

Figure 10:
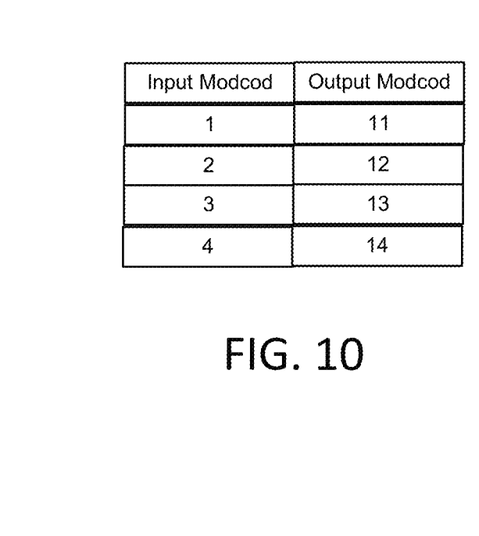
FIG. 10 illustrates a table linking input and output modcod schemes.

FIG. 10 shows an example of a modcod table that includes a column with input modcod schemes and a column with corresponding output modcod schemes. For any given input modcod scheme a corresponding output modcod scheme is listed. Thus, for example, input modcod scheme 2 is linked with corresponding output modcod scheme 12. Where data is received that is modulated and encoded according to input modcod scheme 2, this table may be consulted to identify modcod scheme 12 as the corresponding output modcod scheme. Output modulators may then be configured accordingly to encode and modulate data using modcod scheme 12.

According to one aspect of the present disclosure, a satellite includes an input demodulator configured to apply an input modulation and coding (modcod) scheme; an output modulator configured to apply an output modcod scheme; and an output modcod scheme selector configured to select an output modcod scheme for the output modulator based on the input modcod scheme according a predetermined relationship between input modcod schemes and output modcod schemes. An input modulation and coding scheme (modcod scheme) may be automatically detected by an input demodulator, e.g. by detecting a header of an FEC frame.

Optionally, the satellite may include a lookup table that specifies the predetermined relationship between a plurality of input modcod schemes and a plurality of output modcod schemes, each input modcod scheme linked to a respective output modcod scheme.

Optionally, the plurality of input modcod schemes and the plurality of output modcod schemes are Digital Video Broadcasting-Second generation Extended (DVB-S2X) modcod schemes.

Optionally, the satellite may include a channel lookup table containing entries allocating an input received by the satellite from a gateway to a plurality of output channels.

Optionally, the plurality of output channels consists of n output channels, the output modcod scheme selector is configured to select the output modcod scheme for n output modcod units associated with the n output channels based on the input modcod scheme such that the output modcod scheme has an output data rate that is greater than 1/n times a data rate of the input modcod scheme, or individual output data rates of the n output channels have a collective output data rate that is greater than or equal to the data rate of the input modcod scheme.

Optionally, the satellite may include a frame lookup table, the frame lookup table configured to allocate the input received by the satellite from the gateway among the plurality of output channels with different frames allocated to different output channels.

Optionally, the frame lookup table has entries for modcod blocks, a modcod block being a minimum unit for applying modcod schemes, and wherein the frame lookup table allocates frames of a given modcod block in a pattern indicated by the frame lookup table.

Optionally, the satellite includes a return payload connected to the input demodulator to receive an indication of input signal quality for data demodulated by the input demodulator and to return the indication of input signal quality to a sender of input data.

Optionally, the return payload is further configured to receive an indication of output signal quality for data sent using the output modcod scheme and to relay the indication of output signal quality to the sender of input data.

Optionally, a switch is interposed between an input demodulator and the output modulator, the switch configurable to couple the input demodulator with any output modulator in the satellite.

According to one aspect of the present disclosure, a satellite system includes a gateway that includes a gateway modulator configured to apply a first modulation and coding (modcod) scheme to forward link data; a satellite that includes: a demodulator configured to demodulate received forward link data using the first modcod scheme; a first signal quality detector (e.g. a Signal to Noise Ratio (SNR) detector, or other detector of signal quality) configured to identify a first signal quality indicator (e.g. SNR) for the received forward link data; a return payload connected to the first signal quality detector (e.g. SNR detector) to send the first signal quality indicator (e.g. SNR) for the received forward link data to the gateway; a modcod scheme selector configured to select a second modcod scheme according to the first modcod scheme; a satellite modulator configured to modulate the forward link data using the second modcod scheme; a transmitter configured to transmit the forward link data modulated by the satellite modulator; and a subscriber terminal configured to receive the forward link data transmitted by the transmitter, the subscriber terminal including a second signal quality detector (e.g. SNR detector) configured to identify a second signal quality indicator (e.g. SNR) for forward link data received by the sub scriber terminal.

Optionally, the subscriber terminal includes a transmitter configured to transmit the second SNR to the gateway.

Optionally, the gateway is configured to select the first modcod scheme according to the second signal quality indicator (e.g. second SNR).

Optionally, the modcod scheme selector includes a modcod lookup table that defines a predetermined relationship between the first modcod scheme and the second modcod scheme.

Optionally, the satellite further includes a carrier mapping table and a switch that is configured to allocate received forward link data to a plurality of output carriers according to the carrier mapping table.

Optionally, the switch is further configured to allocate the received forward link data to a plurality of output beams, each output beam including two or more output carriers.

Optionally, the switch is further configured to allocate the received forward link data to the plurality of output carriers according to a frame allocation table in the satellite that allocates frames of a modcod block to output carriers.

According to one aspect of the present disclosure, a satellite includes a plurality of processors including at least a first processor and a second processor, each processor having a plurality of input ports and a plurality of output ports; a data link between the plurality of processors to permit data flow between at least the first processor and the second processor; and a routing table that indicates connection of input ports and output ports of the plurality of processors, including a connection between an input port of the first processor and an output port of the second processor.

Optionally, each processor includes a plurality of input demodulators connected to the plurality of input ports and a plurality of output modulators connected to the plurality of output ports, the satellite further comprising a modulation and coding (modcod) table that indicates a predetermined relationship between input modcod schemes applied by the plurality of input demodulators and output modcod schemes applied by the plurality of output modulators.

Optionally, a modcod block is a minimum unit of modulation and encoding of the input modcod schemes applied by the plurality of input demodulators and the routing table includes mapping of frames of a modcod block received at the input port of the first processor to one or more output ports including the output port of the second processor.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite, comprising:
   an input demodulator configured to apply an input modulation and coding (modcod) scheme to an input signal received by the satellite to generate decoded data;
   an output modulator configured to apply an output modcod scheme to the decoded data to generate an output signal of the satellite; and
   an output modcod scheme selector configured to receive an indicator of the input modcod scheme from the input demodulator, select the output modcod scheme for the output modulator based on the indicator of the input modcod scheme from the input demodulator according a predetermined relationship between input modcod schemes and output modcod schemes.

2. The satellite of claim 1 further comprising a lookup table that specifies the predetermined relationship between a plurality of input modcod schemes used by the input demodulator and a plurality of output modcod schemes used by the output modulator, each input modcod scheme linked to a respective output modcod scheme.

3. The satellite of claim 2 wherein the plurality of input modcod schemes and the plurality of output modcod schemes are Digital Video Broadcasting Second generation Extended (DVB-S2X) modcod schemes.

4. The satellite of claim 1 further comprising a channel lookup table containing entries allocating an input received by the satellite from a gateway to a plurality of output channels.

5. The satellite of claim 4 wherein the plurality of output channels consists of n output channels, the output modcod scheme selector is configured to select the output modcod scheme for n output modcod units associated with the n output channels based on the input modcod scheme such that the output modcod scheme has an output data rate that is equal to or greater than the data rate of the input modcod scheme in aggregate or as allocated for output n.

6. The satellite of claim 4 further comprising a frame lookup table, the frame lookup table configured to allocate the input received by the satellite from the gateway among the plurality of output channels with different frames allocated to different output channels.

7. The satellite of claim 6 wherein the frame lookup table has entries for modcod blocks, a modcod block being a minimum unit for applying modcod schemes, and wherein the frame lookup table allocates frames of a given modcod block in a pattern indicated by the frame lookup table.

8. The satellite of claim 1 further comprising a return payload connected to the input demodulator to receive an indication of input signal quality for data demodulated by the input demodulator and to return the indication of input signal quality to a sender of input data.

9. The satellite of claim 8 wherein the return payload is further configured to receive an indication of output signal quality, from a device external to the satellite, for data sent using the output modcod scheme and to relay the indication of output signal quality to the sender of input data.

10. The satellite of claim 1 further comprising a switch interposed between an input demodulator and the output modulator, the switch configurable to couple the input demodulator with any output modulator in the satellite.

11. The satellite of claim 1 wherein the output modcod scheme selector is further configured to use the indicator of the input modcod scheme from the input demodulator to find a corresponding entry in a lookup table that is stored in the satellite, the entry including the output modcod scheme for the output modulator.

12. The satellite of claim 11 wherein the input signal includes forward link data from a gateway, the gateway includes a gateway modulator configured to apply the first modcod scheme to the forward link data.

13. The satellite of claim 12 wherein the satellite further comprises:
a first signal quality detector configured to identify a first signal quality indicator for the received forward link data; and
a return payload connected to the first signal quality detector to send the first signal quality indicator for the received forward link data to the gateway.

14. The satellite of claim 13 wherein the output signal of the satellite includes the forward link data for a subscriber terminal, the subscriber terminal includes a second signal quality detector configured to identify a second signal quality indicator for forward link data received by the subscriber terminal from the satellite and transmit the second signal quality indicator to the gateway, and the gateway is configured to select the first modcod scheme according to the first signal quality indicator and the second signal quality indicator.

15. The satellite of claim 11 wherein the lookup table is configured to be updated by the gateway.

16. The satellite of claim 1 further comprising:
a plurality of processors including at least a first processor and a second processor, each processor having a plurality of input ports and a plurality of output ports;
a data link between the plurality of processors to permit data flow between at least the first processor and the second processor; and
a routing table that indicates connection of input ports and output ports of the plurality of processors, including a connection between an input port of the first processor and an output port of the second processor.

17. A satellite, comprising:
an input demodulator configured to apply an input modulation and coding (modcod) scheme to an input signal received by the satellite from a gateway to generate decoded data, and to generate an indicator of the input modcod scheme applied;
an output modulator configured to apply an output modcod scheme to the decoded data to generate an output signal of the satellite to a subscriber terminal;
a lookup table in the satellite, the lookup table specifying predetermined relationships between a plurality of input modcod schemes used by the input demodulator and a plurality of output modcod schemes used by the output modulator, each input modcod scheme linked to a respective output modcod scheme; and
an output modcod scheme selector in the satellite, the output modcod scheme selector configured to receive the indicator of the input modcod scheme from the input demodulator, find an entry in the lookup table corresponding to the input modcod scheme indicated, read an indicated output modcod scheme from the lookup table, and select the indicated output modcod scheme for use by the output modulator.

18. The satellite of claim 17 further comprising a channel lookup table containing entries allocating an input received by the satellite from a gateway to n output channels, the output modcod scheme selector is configured to select the output modcod scheme for n output modcod units associated with the n output channels based on the input modcod scheme such that the output modcod scheme has an aggregate output data rate for the n output channels that is equal to or greater than the data rate of the input modcod scheme.

* * * * *

UNITED STATES PATENT AND TRADEMARK OFFICE
CERTIFICATE OF CORRECTION

PATENT NO. : 10,797,784 B2  
APPLICATION NO. : 15/799258  
DATED : October 6, 2020  
INVENTOR(S) : W. Hreha et al.

Page 1 of 1

It is certified that error appears in the above-identified patent and that said Letters Patent is hereby corrected as shown below:

In the Claims

Column 16, Lines 30-31, (Claim 1, Lines 12-13): After "according" and before "a" insert -- to --.

Column 16, Line 41, (Claim 3, Line 3): After "Video" and before "generation" delete "Broadcasting Second" and insert -- Broadcasting - Second --.

Signed and Sealed this  
Nineteenth Day of January, 2021

Andrei Iancu  
*Director of the United States Patent and Trademark Office*